(12) United States Patent
Day et al.

(10) Patent No.: US 9,082,056 B2
(45) Date of Patent: Jul. 14, 2015

(54) TOKEN AND READER

(75) Inventors: Philip N. Day, Fife (GB); Simon J. Forrest, Dundee (GB)

(73) Assignee: NCR Corporation, Duluth, GA (US)

( * ) Notice: Subject to any disclaimer, the term of this patent is extended or adjusted under 35 U.S.C. 154(b) by 2278 days.

(21) Appl. No.: 12/004,361

(22) Filed: Dec. 20, 2007

(65) Prior Publication Data

US 2009/0159678 A1 Jun. 25, 2009

(51) Int. Cl.
*G06K 19/06* (2006.01)
*G06K 19/073* (2006.01)
*G06K 19/067* (2006.01)
*G06K 19/07* (2006.01)

(52) U.S. Cl.
CPC ...... *G06K 19/07345* (2013.01); *G06K 19/0672* (2013.01); *G06K 19/0701* (2013.01)

(58) Field of Classification Search
CPC .................................... G06K 19/0672
USPC ........................................................ 235/439
See application file for complete search history.

(56) References Cited

U.S. PATENT DOCUMENTS

| | | | |
|---|---|---|---|
| 6,398,116 B1* | 6/2002 | Kreft ............................. | 235/492 |
| 7,026,913 B2* | 4/2006 | Bhyravabhotla ............. | 340/5.91 |
| 7,191,952 B2* | 3/2007 | Blossom ....................... | 235/492 |
| 7,578,431 B2* | 8/2009 | Tanner et al. ................. | 235/375 |
| 7,819,321 B2* | 10/2010 | Faith et al. .................... | 235/441 |
| 2001/0054647 A1* | 12/2001 | Keronen et al. .............. | 235/492 |
| 2006/0157553 A1* | 7/2006 | Kelley et al. ................. | 235/380 |
| 2006/0213971 A1* | 9/2006 | Kelley et al. ................. | 235/380 |
| 2007/0194113 A1* | 8/2007 | Esplin et al. ................. | 235/383 |

* cited by examiner

*Primary Examiner* — Thien M Le
*Assistant Examiner* — Toan Ly
(74) *Attorney, Agent, or Firm* — Peter H. Priest

(57) ABSTRACT

A token (2) for storing data to be read by a reader device comprises wireless communication circuitry (10), a processor and a memory (8) for storing the data, and further comprises a communication device (12) for communicating to a user.

1 Claim, 4 Drawing Sheets

TOKEN AND READER

BACKGROUND

The present invention relates to user tokens, in particular contactless user tokens, and to reader devices that may be used to read such tokens. Certain embodiments of the invention relate in particular to contactless cards and to reader devices that may be associated with terminals such as automated teller machines (ATMs) or point of sale terminals.

Contactless cards or other tokens such as mobile phones are becoming more common, with more companies producing such contactless cards or other tokens and associated readers. By a contactless card or other token is meant a card or other token from which data may be read by a reader device without requiring physical contact between the contactless card and the reader device.

Known contactless cards are based upon radio frequency identification (rfid) technology, and include an r.f. transmit/receive antenna and a memory used to store financial, account, transactional, user or other data. The memory may be incorporated in a chip or integrated circuit together with a processor.

Such known contactless cards or tokens are classified as either passive or active. Passive cards do not contain their own power source. Instead, an electromagnetic signal received from a reader device is used to power operation of the card. The electromagnetic signal is received by the antenna on the card and is used to charge up a storage capacitor on the card. Active devices include their own power source, for instance a battery.

In operation, a reader device transmits a request for data to the contactless card in the form of an r.f. electromagnetic signal. The processor decodes the received signal and responds to the request by transmitting data stored on the card to the reader using the transmit/receive antenna. Typically, the data is then used in a transaction. In use, a contactless card is often placed in suitable proximity to the reader, for instance by tapping the card, or a wallet or other container containing the card, on pad that is placed a suitable distance from the reader, in order to enable it to be read, depending on the transmission power. If the transmission power is sufficiently high then the card may be read from on a user's person without requiring them to extract the card and place it near the reader.

Contactless cards or tokens may be used for instance as cash or credit cards, transport cards or season tickets, electronic wallets, security passes, driving licenses, or passports. A contactless card may be used as a SIM card in a mobile phone. In that case the card may communicate with a reader device either via r.f. communication circuitry embedded in the card or in the phone, or via the mobile phone network.

Reader devices may be found in, for instance, self service terminals such as automated teller machines (ATMs), merchant terminals or cash registers in shops or other point of sale terminals, security gates, transport ticket barriers or in handheld units.

Contactless cards appear to offer both competitive and usability benefits, particularly when implemented on self-service terminals such as ATMs, or on point of sale terminals. The user does not have to insert a card or other token into a machine. Instead the card or other token may be read whilst it is on the user's person, for instance in a pocket or wallet.

Security for contactless card transactions is typically provided by encryption of data transmitted between the card and the reader, and by encryption of data stored on the card. Further security may be provided by ensuring that authorized reader devices have a limited transmission range, so that a user has to intentionally bring a card within range for it to be read.

However, there are some potential security problems with contactless cards. In particular, cards can be read against the user's wishes and without the user being aware that the reading of the card is taking place.

The card may be read from within a user's wallet or pocket, for example, without any indication of the card having been read. An unauthorized user could, for instance, implement a contactless card reader having a large transmission range, conceal it in an area that lots of people pass by, and read the card details of all of those passers by. The encrypted data that was obtained could then be subject to decryption techniques. The chances of obtaining at least some decrypted user data would be relatively high, particularly if large quantities of user data were obtained.

Another potential security problem is that unscrupulous merchants could read a card and debit a user account more than once for any given transaction, either by processing a single transaction multiple times using an authorized, visible reader device, or by using a second, hidden reader device. The user would not be aware that additional, unauthorized transactions had taken place.

SUMMARY

The present invention aims to provide an improved, or at least alternative contactless token and reader.

In a first, independent aspect of the invention there is provided a token for storing data to be read by a reader device, the token comprising wireless communication circuitry, a processor and a memory for storing the data, and further comprising a communication device for communicating to a user.

By providing a communication device for communicating to a user, the user may be made aware when the token is being read or is attempted to be read.

The token may be a card, in particular a smart card. Alternatively the token may be a mobile phone, or may be included in or attached to a mobile phone. The token may comprise a SIM card.

Preferably the token is a contactless token. By a contactless token is meant a token that may be read by a reader device without physical contact between the token and the reader device being required.

The processor is preferably configured to respond to requests for data from the read device and/or read data from the memory and to pass the data to the wireless communication circuitry for transmission in accordance with a communications protocol. The processor and memory and/or the wireless communication circuitry may be included in a chip or integrated circuit. The data preferably comprises financial, account, transactional, or user data.

Preferably, the token further comprises an electrical storage device. The token may be a passive token, in which case the electrical storage device is charged using received electromagnetic radiation, preferably electromagnetic radiation received from a reader device. The electrical storage device preferably comprises a storage capacitor. Alternatively the token may be an active token, and the electrical storage device may comprise a battery.

Preferably, the wireless communication circuitry comprises a transmit/receive antenna, and preferably the wireless communication circuitry is r.f. wireless communication circuitry.

The electrical storage device is preferably connected to the antenna, such that it may be charged using electromagnetic signals received by the antenna, preferably signals received from the reader device.

The token may comprise first circuitry and second circuitry, the first circuitry comprising the wireless communication circuitry, the processor, and the memory, and the second circuitry comprising the user communication device, and in operation the second circuitry does not receive any electrical power from the first circuitry.

By ensuring that the second circuitry does not receive any electrical power from the first device, any interference with operation of the first circuitry caused by the presence of the second circuitry can be reduced or minimized. That is particularly important in the case where the first circuitry is standard or pre-existing contactless card circuitry.

The second circuitry may comprise a further electrical storage device for powering the user communication device. Preferably the second circuitry comprises a further antenna. Preferably the second circuitry is powered by received electromagnetic radiation, which may be used to charge the further electrical storage device.

The second circuitry may be separate from the first circuitry. There may be no electrical connection between the first circuitry and the second circuitry. Any interference with the operation of the first circuitry caused by the presence of the second circuitry can thus be minimized. Addition, or retrofitting, of the second circuitry to a token including the first circuitry may be made easier if no electrical connection between the first circuitry and the second circuitry is required.

Preferably, the second circuitry operates independently of the first circuitry.

The user communication device preferably comprises at least one of a display, a speaker, a vibrating device or a buzzer. The user communication device may be used to provide an alarm to a user if an unauthorized attempt is made to read the card.

The user communication device may be operable to communicate to a user information related to communication with the reader device.

The information may comprise status information concerning the status of communication with the reader device.

The user communication device may be operable to provide an indication that the token has received a signal from a reader device. In one example, the second circuitry may comprise a further antenna connected to the communication device, such electromagnetic signals received by the further antenna pass to the communication device and cause it to operate. Alternatively the processor, or a further processor that may be included in the second circuitry, may control operation of the communication device.

Preferably the information comprises an indication that the token has received a request for data from a reader device.

The user communication device may be operable to display at least one transaction parameter. The at least one transaction parameter may comprise at least one of a transaction amount, time, date, or a balance before or following a transaction.

Preferably the token further comprises at least one user input device.

That feature is particularly important, and so in a further independent aspect there is provided a token for storing data to be read by a reader device, the token comprising wireless communication circuitry, a processor and a memory for storing the data, and further comprising at least one user input device.

By providing a user input device, control over communication between a reader device and the token, in particular the reading of the token and/or related transactions, may be provided to a user.

The user input device may comprise a switch, for example a mechanical, electro-mechanical, or electrical switch. The switch may be a capacitive switch. The switch may be a momentary switch.

The at least one user input device may be operable to control transmission to the reader device. The at least one user input device may be operable to control electrical connection between the wireless communication circuitry and the processor. Preferably the user input device is operable to connect or disconnect an antenna included in the wireless communication circuitry.

The at least one user input device may be operable to select data for transmission to the reader device.

The at least one user input device may be operable to select at least one of a card type, a transaction type, or an account. For instance, the at least one user input device may be operable to select a card type amongst a plurality of card types, or a transaction type amongst a plurality of transaction types, or an account amongst a plurality of accounts.

The at least one user input device may comprise a plurality of user input devices, each associated with a respective selection. Preferably each selection is representative of a respective one of a card type, transaction type, or account.

A logo, symbol, text, or other visual data such as a pattern and/or color, may be provided on or associated with each user input device, and may be representative of a selection corresponding to that user input device. In one example, each logo, symbol, text, or other visual data may be representative of a respective credit card company or bank.

Each user input device may comprise, for example, at least one of a button, switch or pressure-sensitive pad.

The token may be configured to not transmit a signal in response to a transmission from a reader device without receiving user approval via the at least one user input device. In particular, the processor may be programmed or otherwise configured to ensure that no signal is transmitted in response to a transmission from a reader device without receiving user approval via the at least one user input device.

The token may be configured to not transmit data requested by the reader device without receiving user approval via the at least one user input device. In particular, the processor may be programmed or otherwise configured to ensure that no requested data is transmitted in response to a transmission from a reader device without receiving user approval via the at least one user input device.

The token may further comprise further wireless communication circuitry associated with the user input device, and preferably the wireless communication circuitry and the further wireless communication circuitry are arranged to each communicate independently with the reader. Preferably the further wireless communication circuitry comprises an antenna.

In a further, independent aspect there is provided a reader apparatus for reading data from a token associated with a user, the reader apparatus comprising wireless communication circuitry for communicating with the token, and at least one user input device responsive to operation by a user when the reader apparatus is operational to cause the reader apparatus to transmit a signal via the wireless communication circuitry.

Thus, power may be conserved, and it may be ensured that the reader apparatus only transmits electromagnetic radiation, or attempts to read a token, when instructed to read a token by a user. Unnecessary or undesired attempts to read tokens may be avoided.

Each user input device of the reader apparatus may comprise, for example, at least one of a button, switch or pressure-sensitive pad.

In the case of a point of sale terminal, in particular, the reader apparatus may be arranged so that the user input device is on one side of the apparatus, and any other input device that may be provided for operation by a seller or other operator of the apparatus may be on the other side of the apparatus.

By the reader apparatus being operational it may be meant that the reader apparatus is in an active state, and receives power. The reader apparatus may be in a minimally operational or sleep state when operational, in which power consumption is minimized.

The reader may be configured to transmit no signal via the reader device's wireless communication circuitry unless the at least one user input device is operated. Thus power consumption may be kept to a minimum and unnecessary or unauthorized reads may be avoided.

The reader apparatus preferably comprises a control processor that controls operation of the reader apparatus, and in particular operation of the wireless communication circuitry, in dependence on operation of the at least one user input device.

It may be that a signal is only transmitted via the wireless communication circuitry during operation of the at least one user input device.

The at least one user input device may be operable by a user to cause the reader device to read the user's token.

The at least one user input device may be operable to select data representative of at least one of a card type, a transaction type, or an account, and the reader device may be configured to read the contactless token in dependence on the selected data.

The reader apparatus' at least one user input device may comprise a plurality of user input devices, each associated with a respective data selection.

Preferably each selection is representative of a respective one of a card type, transaction type, or account.

Preferably a logo, symbol, text other visual data such as a pattern and/or color, is on or associated with each user input device of the reader apparatus, and is representative of a selection corresponding to that user input device. In one example, each logo, symbol, text other visual data may be representative of a respective credit card company or bank.

In a further, independent aspect there is provided control apparatus for controlling operation of a reader device for a contactless token, the control apparatus comprising at least one user input device operable by a user to select at least one of a card type, a transaction type, or an account, and to send a signal representative of the selected card type, transaction type or account to an output of the control apparatus.

The output may be an electrical connection for connecting to the reader device. Alternatively the output may comprise a transmit antenna, operable to transmit the signal to the reader device.

The control apparatus may be a self-contained unit and/or may form part of a decal or transfer, for attachment to a reader device.

By providing such a self-contained unit and/or decal or transfer, for attachment to a reader device, the modification or retrofitting of existing reader devices, if desired, may be made more straightforward or efficient.

In a further, independent aspect there is provided circuitry for attachment to a contactless token, the circuitry comprising an antenna for receiving signals from a reader device, a user communication device for communicating to a user information concerning received signals, and an electrical storage device for powering the user communication device.

The circuitry may be included in a self-contained unit, decal or transfer for attachment to the contactless token. Thus, modification or retrofitting of an existing contactless token, if desired, may be made more straightforward or efficient. The circuitry may be second circuitry as described or claimed herein.

In another, independent aspect there is provided a method of modifying a contactless token comprising: providing circuitry for attachment to the existing contactless token, the circuitry comprising an antenna for receiving signals from a reader device, a user communication device for communicating to a user information concerning received signals; and attaching the circuitry to the contactless token.

Preferably the circuitry comprises an electrical storage device for powering the user communication device. The electrical storage device may be connected to the antenna, and in operation may be charged by electromagnetic radiation received at the antenna. The electrical storage device may comprise a storage capacitor. Alternatively, the electrical storage device may comprise a battery.

Any feature in one aspect of the invention may be applied to other aspects of the invention, in any appropriate combination. In particular, apparatus features may be applied to method features and vice versa.

BRIEF DESCRIPTION OF THE DRAWINGS

Embodiments of the invention will now be described, by way of example only, with reference to the accompanying drawings in which.

DETAILED DESCRIPTION

Figure 1:
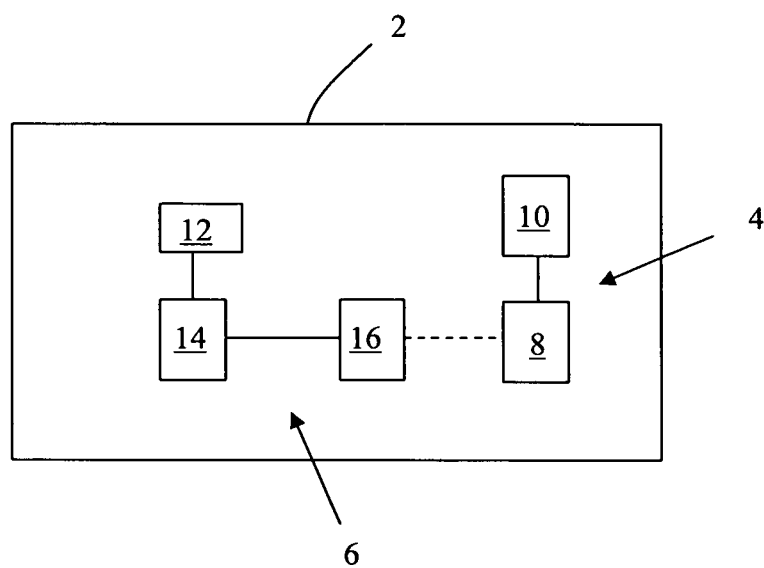
FIG. 1 is a schematic diagram of a contactless card according to a first embodiment.

FIG. 1 shows a contactless card 2 according to a first embodiment. The contactless card 2 comprises first circuitry 4 and second circuitry 6.

The first circuitry 4 is known contactless card rfid circuitry, and comprises a chip 8 which includes a processor and a memory for storing financial, transactional, user or other data, and r.f. wireless communication and power circuitry 10 comprising an r.f. transmit/receive antenna and associated antenna circuitry and a storage capacitor connected to the antenna circuitry.

The second circuitry 6 comprises a communication device in the form of an LED 12 which acts as a feedback indicator to a user concerning communication with the card. The LED 12 is connected to further power circuitry 14 comprising a further antenna and a further storage capacitor for use as a power source in operation. The further power circuitry 14 is also connected to a user input device, in the form of switch device 16. The switch device 16 is connected to the chip 8 of the first circuitry 4. The switch device 16 can operate as a confirmation input device enabling a user to confirm that he wishes communication with a reader device, or a transaction, to proceed. The switch device is, for example, a momentary switch, such as a mechanical, electromechanical or capacitive switch.

In operation, a reader device in the vicinity of the card 2 transmits r.f. electromagnetic signals that are received by the card 2. In response to the received r.f. signals, and in accordance with known techniques, the storage capacitor of the first circuitry is charged up using power harvested from the received r.f. signals, and is used to power operation of the chip 8, and to activate the communications protocol used for communication between the reader device and the card 2. The processor included in the chip 8 decodes the signal received from the reader device according to the communications protocol.

At the same time, the further power circuitry 14 of the second circuitry also receives the r.f. signals and charges up the further storage capacitor, which is then used to power the LED 12. Thus the LED 12, which may function as a feedback indicator to the user, is activated using parasitic power technology from power harvested from the r.f. signal by the second circuitry 6, without affecting the power harvested by the first circuitry 4 used to power the chip 8 and put the communications protocol into effect.

In the preferred embodiment the LED 12 lights up to indicate to the user that a reader is attempting to read the card. If the user wishes the reading of the card to proceed, he presses the switch device 16, which sends a signal to the chip 8 of the first circuitry 4. In response to receipt of the signal, the processor of the chip 8 puts the communications protocol with the reader into effect, and transmits data to the reader. If the user does not press the switch device 16, the processor does not put the communications protocol into effect and data is not transmitted to the reader. The reader is thus not able to read the card 2.

The user feedback process in the preferred embodiment clearly does not require the same level of processing that is required by the existing contactless technology in the first circuitry, due to the simplicity of the LED 12 (or other indicator units or display in variants of the embodiment). Thus, in the preferred embodiment the second circuitry simply collects power and stores it to drive the LED 12, or other indicator units or display and the switch device 16. User confirmation is provided by the simple switching system that allows a confirmation signal to be passed into the existing contactless technology in the first circuit 4 by operation of the switch device 16.

In a variant of the preferred embodiment, the switch is simply located in the signal path between the antenna of the first circuitry 4 and the chip 8, rather than being arranged so as to send a signal to the chip 8. In that variant, if the switch is not closed by a user the antenna is not connected and the card cannot be read. For an active card, which includes its own power supply, such as a battery, the switch may simply enable or disable the power supply.

The preferred embodiment provides relatively simple feedback to a user, and has a relatively simple mode of operation. The contactless card does not respond to read requests unless the user activates the card. This activation is user-controlled, and momentary.

In certain alternative embodiments, low-power lights replace the LED 12, and are used to show, for instance, the status of any reads of the card occurring at the time. One light, for example a red light, may be used to indicate that a read has been requested. Another light, for example an orange light, may be used to indicate that a read is in progress, and a further light, for example a green light, may be used to indicate that a read has taken place. The different colors may be different in other examples or, in another example, the colors of the lights may be the same.

In other alternative embodiments, a more advanced display, for instance an LED array or liquid crystal display or low power display as used in smart labels in the pharmaceutical and food industry, is provided instead of or in addition to the LED 12 or the low-power lights. Such a display is used to feedback more detailed information to the user about any transaction requested or occurring on the card. The display may, for instance, display the amount and/or time of the last transaction that has taken place. In those other alternative embodiments, the chip 8 or an additional display processor is used to control operation of the display.

In certain embodiments, the display is based on chemical reaction of a display substrate or on other printed electronics technology to provide the display output, and does not need complex processing capabilities for operation. Such displays require very low power to initiate the reactions and can be used, for instance, to maintain the display of the amount and/or time of a transaction on the display until the next transaction is required. Thus the user can be provided with a lasting record of the last transaction that was carried out, and can be provided with a visual receipt of the transaction.

In another mode of operation, the display is used to inform the user that the card has been read, and ask for confirmation that a transaction should go ahead. If the transaction is confirmed by the user by operation of the user input device, then the card allows the read to go ahead, otherwise the transaction is cancelled. If confirmation is not received within a specified time limit (for example, 10 seconds), then the transaction is also cancelled by the attempted card read timing out.

In variants of each of the embodiments described above, the user input device is not included. In such variants the feedback indicators, for instance the LED 12, lights or display, are used to provide information to a user concerning reading of the card or attempted reading of the card, or transactions, but the user does not control whether or not reading of the card or transactions take place. The user, however, may be made aware that an unauthorized reading of the card has taken place and may then take further action himself concerning the unauthorized transaction, if necessary.

Figure 2:
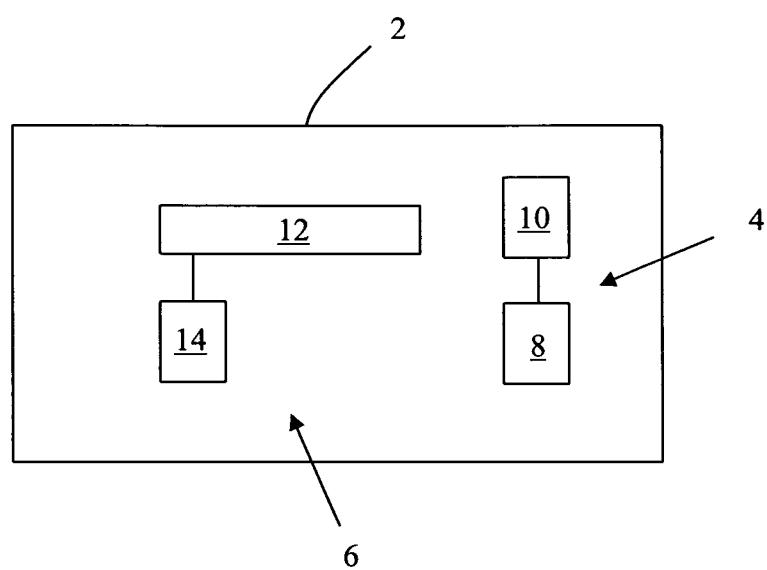
FIG. 2 is a schematic diagram of a variant of the contactless card of FIG. 1.

A variant of the preferred embodiment, in which a user input device is not included on the card 2, is illustrated in FIG. 2. In that variant, the first circuitry 4 is separate from the second circuitry 6, and there is no electrical connection between the first circuitry 4 and the second circuitry 6.

Embodiments or variants that do not include a user input device can be relatively easy to add to existing cards or card blanks during the production process or afterwards. In one example, the second circuitry is provided as a self-contained unit or decal or transfer that may be stuck onto an existing card or other token by a user.

In other variants of the embodiments described above, a or the user input device is included on the card, but there is no electrical connection between the first circuitry, made up of known rfid contactless card circuitry, and the second circuitry. In such variants, the second circuitry includes its own wireless communication circuitry and processor and its own communications protocol.

The second circuitry is thus able to provide a parallel r.f. signal to the reader through its own protocol that could be processed or implemented at the application level in the reader or associated device, such as an ATM. In such variants, the second circuitry may be used by the user to control communications or transactions by communicating directly with the reader rather than by affecting operation of the first circuitry comprising known contactless card technology. The contactless communications protocol would not have to be amended to implement such a parallel approach, making retrofitting into existing contactless systems straightforward, without a need for existing contactless communication standards or protocols to be changed.

In the embodiments and variants described above, power is obtained parasitically from received electromagnetic signals, in particular signals from a reader device, to drive the LED, lights, display or other feedback indicators. In variants of the embodiments, a battery, or other power source such as solar power source, is included in the card and is used as a power source to drive the LED, lights, display or other feedback indicators. The power source may, alternatively, parasitically harvest power in other ways than from received electromagnetic radiation, for example kinetically from movement or vibration of the token. In other variants the power circuitry 8 of the first circuitry is used to power both the first circuitry and the second circuitry.

In other variants of each of the embodiments described above, the user input device is included in the second circuitry, but no feedback indicator, such as an LED, lights or display is included.

In other embodiments, an alternative user feedback mechanism is provided, that enables a user to select between, for instance, different card types, transaction types or accounts. An example of a card in such an embodiment is illustrated in FIG. 3, in which like features are indicated by like reference numerals.

Figure 3:
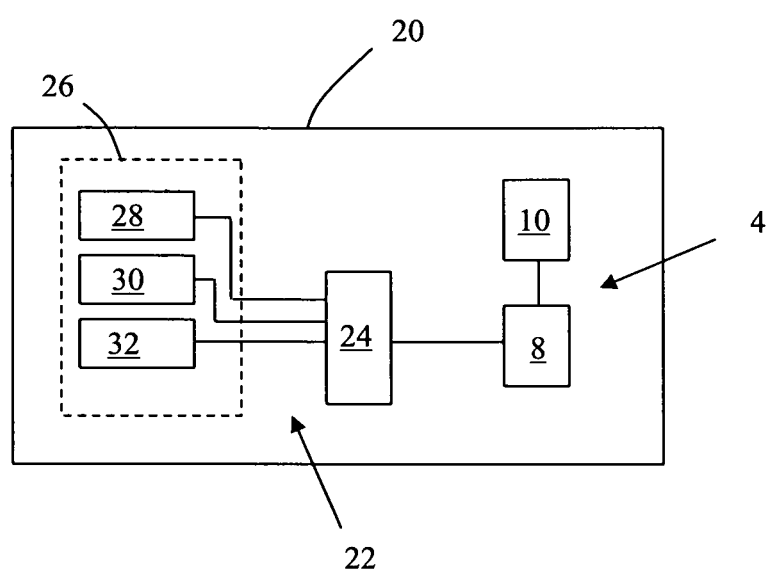
FIG. 3 is a schematic diagram of a contactless card according to a second embodiment.

The card 20 of FIG. 3 is a multi-protocol card, which can be used for example as a cheque guarantee, credit or debit card. The card includes the first circuitry 4, comprising known contactless card rfid circuitry, which is also included in the cards of FIGS. 1 and 2. The card also includes second circuitry 22, which comprises a switching multiplexer 24, and an activation panel 26 in the form of a decal or transfer, within or under which are switches 28 30 32.

A user can apply pressure to operate one of the switches 28 30 32 to enable specific functionality associated with the switch or to enable or disable a transaction. A signal is sent from the switch that is operated, via the switching multiplexer, to the chip 8 and the specific functionality is enabled, or the transaction is enabled or disabled, by the chip 8 in response to the signal. Data stored in the chip 8 may be selected for transmission to the reader device in dependence on the signal received from the switching multiplexer, and thus in dependence on the switch that is operated.

In one example, the card 20 may be used as either a credit card or a debit card. In that example, for each transaction, one of the switches is used to select use of the card as a credit card, and another of the switches is used to select use of the card as a debit card.

In another example, the card can also be used for selection of different information to be made available to the reader. The user controls which data is made available to the reader by pressing the appropriate switch.

A logo, symbol, text or other visual data is provided on each switch 28 30 32, representative of the function of that switch. For instance, in one example, if the card can be used to make payments from different accounts, for instance a credit card account, a cheque account, or a current account, then each switch corresponds to one of those accounts, and a symbol representing the corresponding account is provided on each switch. Alternatively, in another example, if the card can be used to make payments from any of three different credit card accounts with different credit card companies, then each switch corresponds to one of those credit card accounts and the logo of the corresponding credit card company is provided on each switch.

Figure 4:
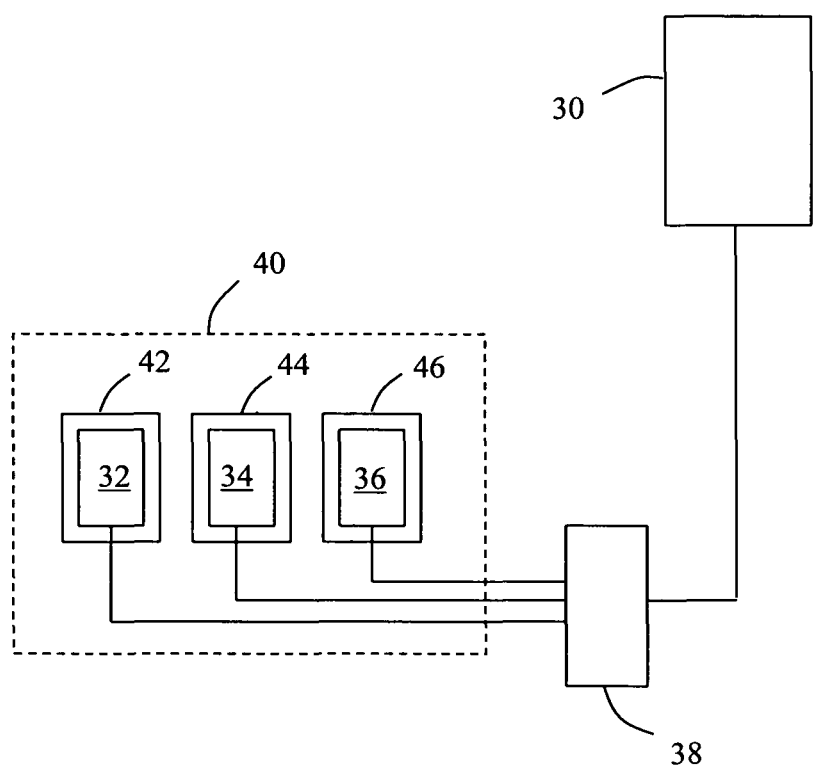
FIG. 4 is a schematic diagram of a card reader apparatus.

The embodiments and variants described above relate to the provision of a communication device an/or a user input device on a token. User selections, confirmations or other instructions may also be provided via a card reader, as well as or instead of via the token. An embodiment of such a card reader is illustrated in FIG. 4.

The system comprises a card reader 30, and an array of momentary switches 32 34 36 having activation areas and connected to the card reader 30 via a switch multiplexer 38. The switches 32 34 36 are positioned behind an descriptive decal or transfer 40 which is fixed to apparatus, for instance an ATM or point of sale terminal, with which the card reader 30 is associated, or within which the card reader 30 is located. The decal or transfer 40 includes areas 42 44 46 on which is provided a logo, symbol, text or other visual data corresponding to the functionality of each switch.

The switches 32 34 36 together with the decal or transfer 40 form an activation panel.

The card reader does not attempt to read a card until the user has activated the device by pressing on the activation area of one of the switches 32 34 36. This activation is user-controlled, and momentary. In one implementation the switches are momentary switches (mechanical, electromechanical or capacitive).

The descriptive areas 42 44 46 of the decal or transfer 40 show logos, symbols or text representative of the different card networks supported by the contactless card reader, for instance different credit card companies in one example.

The user presses and holds the momentary switch 32 34 36 associated with the required credit card network (for instance, by pressing the area labeled with the credit card company's logo). The selection of the requested card network is passed through the switching multiplexer 38, which sends an activation signal for the contactless protocol for the specific card network to the reader 30. The card reader then attempts to read the user's card according to the communication protocol for that credit card network, and may give feedback as to whether the read was successful or not. The card reader is then de-activated until the next touch on the activation panel.

Thus, a user is able to control which of the cards in a reading area of the reader 30 are selected to be read. Only the contactless protocol and contactless network that the consumer selects are activated through the switching system and the data provided to the contactless reader. Thus, potential errors, potential delays associated with card and protocol detection routines that might otherwise be required at the reader, and overall transaction time may be reduced. In contrast, in known contactless systems a card reader typically activates all of the cards within range, which can cause ambiguities, delays, and problems with the wrong card being used.

In the embodiments and variants described above the communication device, when present, is described as being a visual communication device, for instance an LED, a light or lights, or a display. In further variants, other types of communication device are included as well as or instead of a visual communication device. Such other types of communication device include devices that communicate to a user by way of the user's senses of hearing or touch. The other types of communication device include for instance, a speaker, buzzer, vibrating device, or heater.

It will be understood that the present invention has been described above purely by way of example, and modifications of detail can be made within the scope of the invention.

Each feature disclosed in the description, and (where appropriate) the claims and drawings may be provided independently or in any appropriate combination.

The invention claimed is:

1. Circuitry for attachment to a contactless token, the circuitry comprising an antenna for receiving signals from a reader device of a transaction terminal requesting data from the token, a user communication device operable to provide an indication that the antenna has received the signals from the reader device, and an electrical storage device for powering the user communication device, the circuitry being included in a self-contained unit, decal or transfer for attachment to the contactless token.

* * * * *